United States Patent [19]
Bjork et al.

[11] 3,853,348
[45] Dec. 10, 1974

[54] BOOT FOR CAMPER-TRUCK COMBINATION

[76] Inventors: Robert M. Bjork; Steven Robert Bjork, both of 10901 Topeka Dr., Northridge, Calif. 91324

[22] Filed: June 12, 1973

[21] Appl. No.: 369,300

[52] U.S. Cl............................ 296/23 MC, 285/189
[51] Int. Cl.............................................. B60p 3/32
[58] Field of Search ..... 296/23 MC, 23 R; 280/403; 52/208, 400; 285/189, 201, 222, DIG. 18; 49/483; 285/260

[56] References Cited
UNITED STATES PATENTS
| | | | |
|---|---|---|---|
| 2,326,292 | 8/1943 | Dorman | 285/222 |
| 2,641,486 | 6/1953 | Vance | 285/222 |
| 3,625,560 | 12/1971 | Bjork | 296/23 MC |

Primary Examiner—Robert B. Reeves
Assistant Examiner—H. Grant Skaggs
Attorney, Agent, or Firm—Jessup & Beecher

[57] ABSTRACT

A removable boot for intercoupling the rear window aperture of a truck cab and the front facing window aperture of a camper carried by the truck is provided, the boot serving to afford communication between the truck and the camper. The boot is intended for use in conjunction with truck cabs having sliding rear windows, the boot being constructed to fit into a peripheral channel in the sliding window frame of the cab to the rear of the window itself. The boot includes a tubular plastic casing member with open ends. A two-piece metal frame is encased in the forward end of the tubular casing, so that it and the casing provide a hinge effect for easy installation and removal of the boot in the aforesaid peripheral channel in the sliding window frame of the truck cab. When the boot is in place, the window can still be opened and closed without in any way being impeded by the boot.

3 Claims, 6 Drawing Figures

PATENTED DEC 10 1974          3,853,348

BOOT FOR CAMPER-TRUCK COMBINATION

BACKGROUND OF THE INVENTION

The boot of the present invention is of the same general type as described in U.S. Pat. No. 3,625,560 which issued Dec. 7, 1971 in the name of the present inventor. As described in the patent, it is most desirable to provide a connecting passage between the cab and the camper in a truck/camper asembly. This is usually achieved by removing the rear window from the cab of the truck, and by also removing the facing front window from the forward wall of the camper. The two window apertures are then intercoupled by means of an open flexible boot, which extends between the truck and the camper and into the window apertures so as to define a communication passage between the cab and the camper.

An improved boot assembly is described in U.S. Pat. No. 3,625,560 which may be installed quickly and easily without the need for tools, and which does not result in disfiguring holes in the body of the truck cab. The boot assembly described in the patent is also advantageous in that it provides a waater-tight, air-tight and dust-tight joint insofar as the interiors of the cab and the camper are concerned.

The boot assembly of the present invention, as mentioned above, is intended to be used in conjunction with truck cabs which have sliding rear windows. A feature of the assembly of the invention is that it may be easily installed, and it does not necessitate the removal of the window. Instead, the forward end of the boot assembly of the invention may be quickly pressed into place in the peripheral channel which surrounds the sliding window in the rear of the cab, as will be described, so as to provide a water-tight and dust-tight joint, likewise without the need for tools or disfiguring holes. Then, when the boot is in place the window can still be opened and closed.

DETAILED DESCRIPTION OF THE ILLUSTRATED EMBODIMENT

Figure 1:
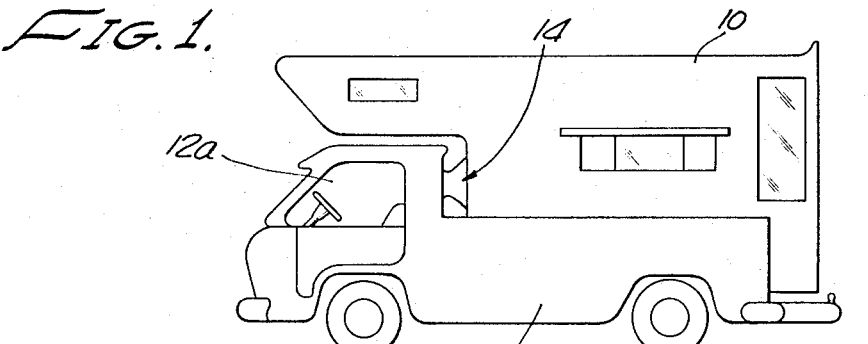
FIG. 1 is a side elevation of a truck and camper assembly showing a boot extending between the forward end of the camper and the rear wall of the truck cab, the boot being constructed, for example, in accordance with the concepts of the present invention.
Figure 6:
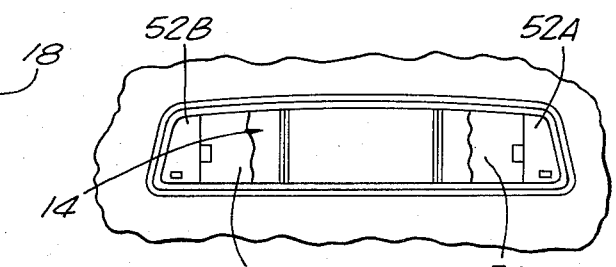
FIG. 6 is a view like FIG. 3 and showing the boot installed in conjunction with a sliding window.

The truck/camper assembly shown in FIG. 1 includes a usual type of camper 10 which is mounted on the back of a truck 12. The truck 12 has a cab 12a. In order to provide a communication passage between the cab 12a and the interior of the camper 10, a boot 14 extends between the rear wall of the cab and the forward wall of the camper. The boot 14 forms an enclosed passageway which extends into a peripheral channel in the window aperture in the rear of the truck, and into the window aperture in the forward wall of the camper. A sliding window may be mounted in a second channel adjacent the peripheral channel in accordance with usual truck construction, such as shown in FIG. 6. The sliding window may comprise, for example, two sliding panels 50A and 50B, or two outer stationary panels 52A, 52B.

Figure 4:
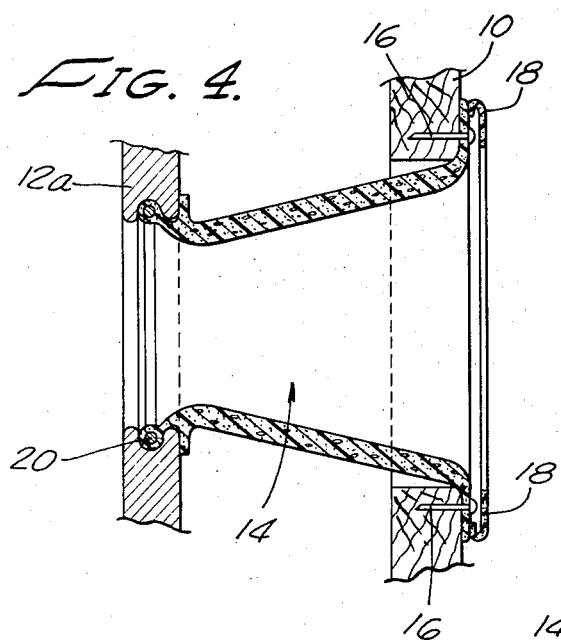
FIG. 4 is a cross-sectional view of the boot of FIG. 1.

As best shown in FIG. 4, the boot 14 may be formed of two layers of appropriate fabric, such as vinyl plastic, with a layer of foam plastic between the two layers of the fabric. The boot may be stapled into the wooden wall of the camper by means, for example, of staples 16. The heads of the staples 16 may be covered by a flap 18 which is sewn around the end of the boot 14.

Figure 5:
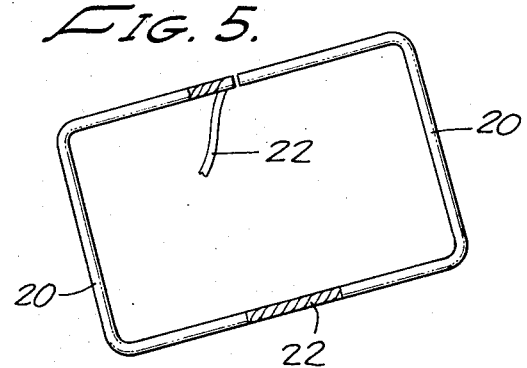
FIG. 5 is a perspective representation of a metallic frame which is encased in the forward end of the boot to form a mounting means for removably mounting the boot into a peripheral channel in the truck window aperture.

The other end of the boot 14 is sewn around a frame 20. The frame 20 is formed of two U-shaped independent metallic sections, as shown in FIG. 5, which are sewn into the forward end of the boot, and which form diametrically opposed hinge joints between their adjacent ends. A hinge is formed at the two joints of the frame 20 by means, for example, of a layer of adhesive tape 22 wrapped around each of the two joints. The frame may be formed, for example, of stainless steel wire.

Figure 3:
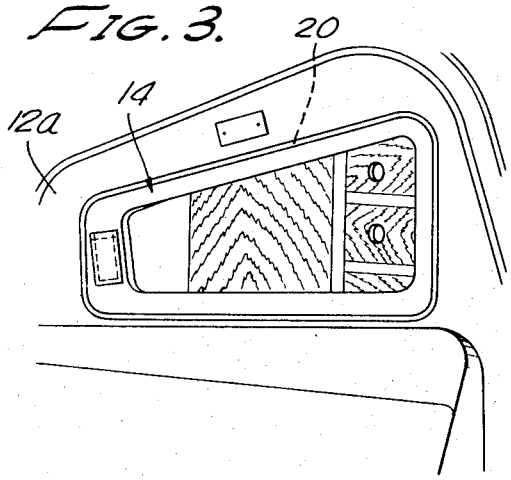
FIG. 3 is a view like FIG. 2, and showing the boot in place in the truck window aperture.
Figure 2:
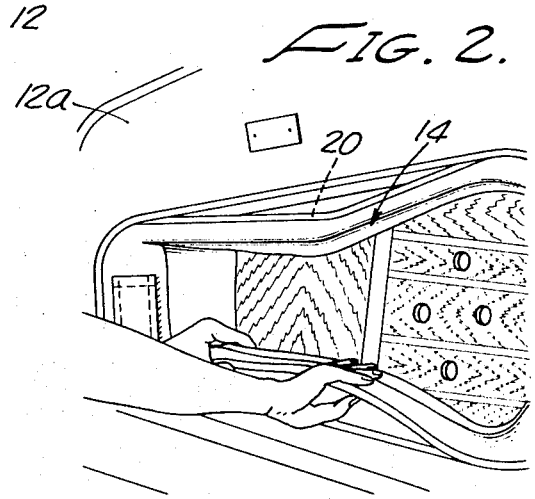
FIG. 2 is an internal view of the boot of FIG. 1 looking into the camper from the rear of the truck cab, and showing the boot in the process of being installed.

When the frame 20 is sewn into the end of the boot 14, as shown in FIG. 4, it is a simple matter to install the end of the boot into a peripheral channel around the sliding rear window of the cab 12a. For example, as shown in FIG. 2, the end is first inserted into the window aperture with the frame 20 bent inwardly. Then, when the forward end of the boot is in place in the peripheral channel, the frame is straightened out into the position shown in FIG. 3.

The boot of the invention, therefore, may be easily and quickly installed into the window aperture of the cab without impeding in any way the action of the sliding window; and it may just as easily be removed, when the camper is to be taken off the truck 12.

The invention provides, therefore, an improved boot assembly for use in conjunction with a truck/camper combination, and especially for use in conjunction with the sliding rear window of a truck cab. The boot assembly of the invention may be easily attached into the window aperture of the cab witout the need for tools, or for disfiguring holes in the body of the cab. When the boot assembly is in place in the peripheral channel of the rear truck window, it is sealed to the truck with a dust-tight, water-tight and air-tight seal.

While a particular embodiment of the invention has been shown and described, modifications may be made. It is intended in the claims to cover the modifications which come within the spirit and scope of the invention.

What is claimed:

1. A boot assembly intercoupling the forward end of the camper to the rear end of a truck cab, and having a forward end extending into a window aperture in the rear wall of the cab and supported in a peripheral channel extending around said aperture, and having a rear end extending into a window aperture in the forward wall of the camper, said boot assembly comprising: a flexible tubular member having a first open end and a second open end; and a two-piece frame member formed of a pair of rigid U-shaped wires encased in said first open end of said flexible tubular member, each of said rigid wires extending half-way around the open end of the said tubular member so that the ends of the two wires are adjacent to one another, said wires being contoured to fit into the peripheral channel of the window aperture in the rear wall of the cab with the adjacent ends of the wires forming diametrically opposite hinge joints for the first open end so that said frame member may be snapped into the annular channel.

2. The boot assembly defined in claim 1, in which said flexible tubular member, said frame, and aforesaid window aperture in the cab have a generally rectangular cross-sectional configuration.

3. The boot assembly defined in claim 1, and which includes adhesive tape wrappings around each pair of adjacent ends of the wires.

* * * * *